United States Patent
Tsugawa

Patent Number: 5,273,223
Date of Patent: Dec. 28, 1993

[54] NOZZLE MOUNTING ARRANGEMENT ON A STATOR COIL WINDING MACHINE

[75] Inventor: Takayuki Tsugawa, Kanagawa, Japan

[73] Assignee: Odawara Engineering Co., Ltd., Kanagawa, Japan

[21] Appl. No.: 846,671

[22] Filed: Mar. 5, 1992

[30] Foreign Application Priority Data

Mar. 15, 1991 [JP] Japan .................. 3-104994

[51] Int. Cl.⁵ .................. H02K 15/06; H02K 3/12
[52] U.S. Cl. .................. 242/1.1 R; 29/596
[58] Field of Search ............ 242/1.1 R, 1.1 A, 7.03, 242/1.1 E; 29/605, 733, 596, 729, 732

[56] References Cited

U.S. PATENT DOCUMENTS

| | | | |
|---|---|---|---|
| 3,677,480 | 7/1972 | Schanke | 242/1.1 R |
| 3,901,454 | 8/1975 | Reiger, Jr. | |
| 4,858,835 | 8/1989 | Luciani et al. | |
| 4,991,782 | 2/1991 | Luciani | 29/596 X |
| 4,997,138 | 3/1991 | Luciani et al. | 242/7.03 |

FOREIGN PATENT DOCUMENTS

1334295  8/1987  U.S.S.R. .................. 242/7.03

Primary Examiner—Andrew M. Falik
Attorney, Agent, or Firm—Armstrong, Westerman, Hattori, McLeland & Naughton

[57] ABSTRACT

A stator coil winding machine for winding a wire around a neck portion of each pole. A spindle through which the wire is inserted is reciprocated in an axial direction thereof. A nozzle is provided at one end of the spindle, and the nozzle is inserted through a slot of a stator core by the axial reciprocation of the spindle. The spindle is reciprocated axially and is reciprocatively rotated at a predetermined angle at opposite ends of the axial reciprocation. Thus, the wire is supplied from the nozzle and is wound around the neck portion. The nozzle is pivotally mounted on the spindle so as to be tiltable in the axial direction of the spindle. In another embodiment, a nozzle swinging device is provided to tilt the nozzle in a direction counter to an advancing direction of the spindle.

7 Claims, 10 Drawing Sheets

NOZZLE MOUNTING ARRANGEMENT ON A STATOR COIL WINDING MACHINE

BACKGROUND OF THE INVENTION

1. Field of the Invention

The present invention relates to a stator coil winding machine for winding a field coil around a stator of an electrical rotary machine such as a motor.

2. Description of the Prior Art

In a conventional stator coil winding machine as disclosed in U.S. Pat. Nos. 3,901,454 and 4,858,835, for example, a spindle through which a wire is inserted is reciprocated in an axial direction thereof. A nozzle is provided at one end of the spindle, and the nozzle is inserted through a slot of a stator core by the axial reciprocation of the spindle. The spindle is reciprocatively rotated about an axis thereof at a predetermined angle at opposite ends of a stroke of the axial reciprocation. Thus, the wire is supplied from the nozzle and is wound around a neck portion of each pole. The nozzle is fixedly mounted to one end of the spindle so as to extend in a direction perpendicular to the axis of the spindle.

In such a conventional stator coil winding machine, the nozzle from which the wire is drawn is fixed to the spindle in perpendicular relationship to the axis of the spindle, as mentioned above. Accordingly, in association with the axial reciprocation of the spindle, the wire is drawn from one end of the nozzle in a direction substantially perpendicular to an axis of the nozzle.

A predetermined tension is applied to the wire by a tension device such as an electromagnetic fluid clutch of a magnetic powder type. Accordingly, in the case that the wire has a large diameter, a frictional resistance of the wire to be bent at right angles at one end of the nozzle becomes remarkably large to rapidly increase the wire tension. As a result, the linear motion of the spindle becomes more difficult. Further, there is a possibility that a cover film of the wire is separated or one end of the nozzle is rapidly worn because of the friction between the wire and the nozzle.

SUMMARY OF THE INVENTION

It is accordingly an object of the present invention to reduce the frictional resistance generating upon drawing the wire from the nozzle.

According to the present invention achieving the above object, there is provided in a stator coil winding machine for winding a wire, including a spindle provided at one end thereof with a nozzle for supplying the wire, the wire being wound by reciprocating the spindle in an axial direction thereof and reciprocatively rotating the spindle about an axis thereof at opposite ends of a stroke of axial reciprocation of the spindle; the improvement characterized in that there is further provided nozzle swinging means wherein the nozzle is mounted on the spindle so as to be tiltable in the axial direction of the spindle, and the nozzle is tilted in a direction counter to an advancing direction of the spindle.

The above and other objects, features and advantages of the invention will be apparent from the following detailed description which is to be read in conjunction with the accompanying drawings.

DETAILED DESCRIPTION OF THE PREFERRED EMBODIMENTS

There will now be described some preferred embodiment of the present invention with reference to the drawings.

Figure 1:
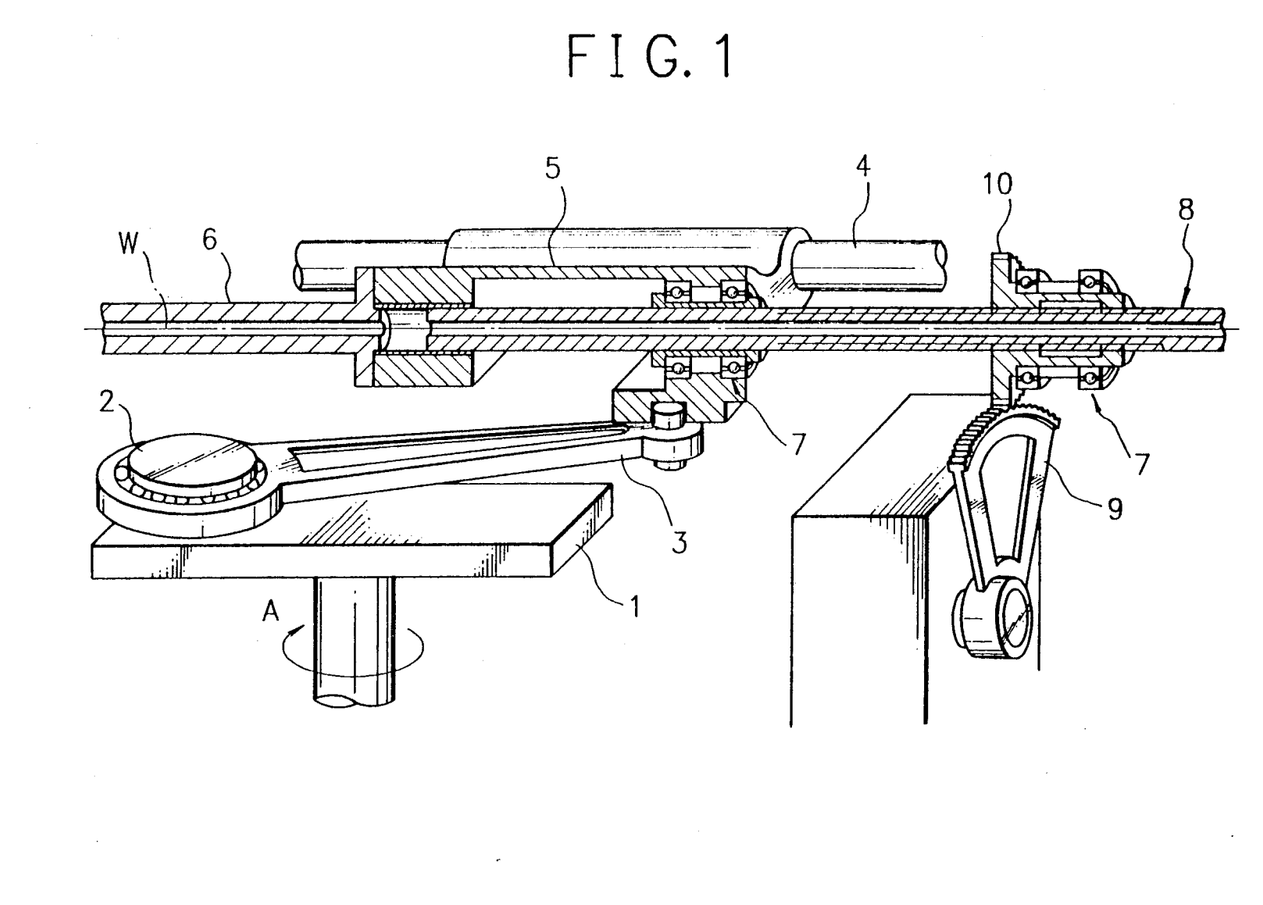
FIG. 1 is a sectional view illustrating a spindle driving portion of a stator coil winding machine according to a first preferred embodiment of the present invention.

FIG. 1 is a sectional view schematically illustrating a spindle driving portion of a stator coil winding machine according to a first preferred embodiment of the present invention.

In the spindle driving portion shown in FIG. 1, a crank 1 is adapted to be rotated in a direction of arrow A in FIG. 1. A crank pin 2 is eccentrically provided on the crank 1. A slider 5 is movably connected through a connecting rod 3 to the crank pin 2 so that a circular motion of the crank pin 2 is converted to a linear motion of the slider 5 through the connecting rod 3. The slider 5 is adapted to be guided by a guide shaft 4. A connecting shaft 6 is fixed to a left end of the slider 5 as viewed in FIG. 1. A wire W is inserted through the connecting shaft 6. A spindle 8 is connected through a bearing 7 to a right end of the slider 5 as viewed in FIG. 1. The spindle 8 is axially movable together with the slider 5, and is freely rotatable relative to the slider 5.

A sector gear 9 is swung at a predetermined angle through a cam mechanism (not shown) by the same driving source as that of the spindle driving portion. A driven gear 10 is spline-engaged with an outer circumference of the spindle 8. The sector gear 9 is meshed with the driven gear 10, so that the spindle 8 may be reciprocatably rotated at a predetermined angle about the axis of the spindle 8.

Figure 2:
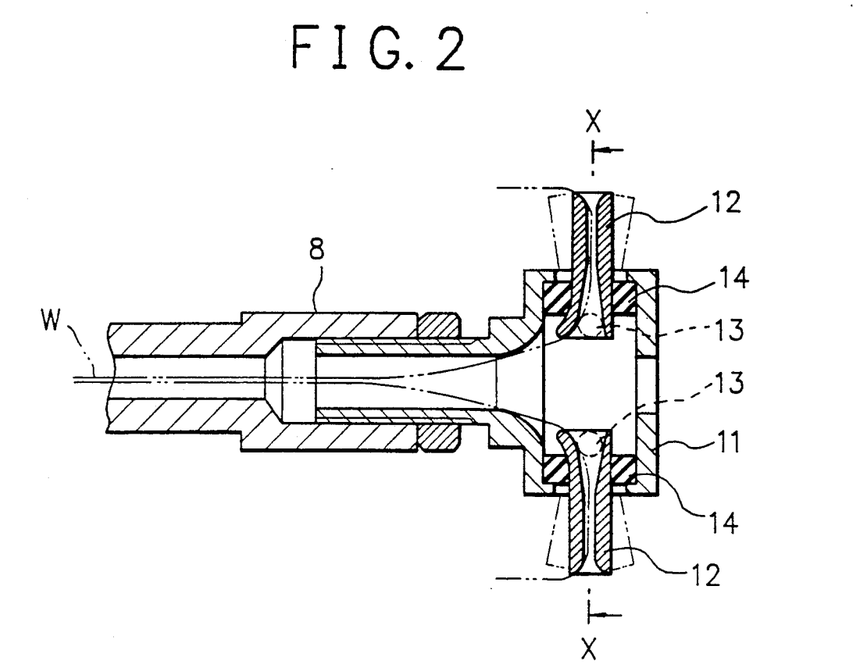
FIG. 2 is a sectional view of an essential part of the first preferred embodiment of the present invention.
Figure 3:
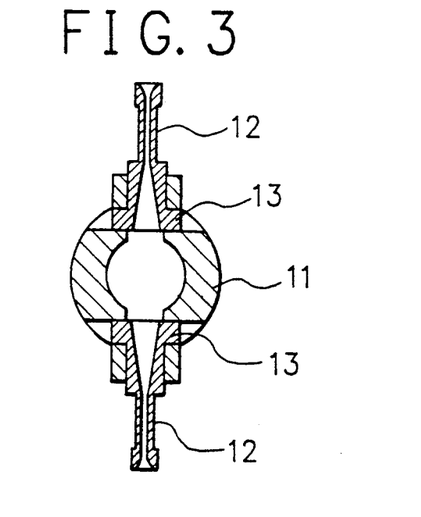
FIG. 3 is a cross section taken along the line X—X in FIG. 2.

As shown in FIGS. 2 and 3, a nozzle holder 11 is fixed to a front end of the spindle 8. Two nozzles 12 are pivotably mounted through two shafts 13, respectively, to the nozzle holder 11, so that each nozzle 12 may be tilted in the axial direction of the spindle 8. A bumper 14 having an elasticity is interposed between each nozzle 12 and the nozzle holder 11, so that a tilt angle of each nozzle 12 is restricted in the range shown by a phantom line in FIG. 2 and each nozzle 12 is normally maintained at a right angle to the spindle 8 as shown by a solid line in FIG. 2.

Figure 4:
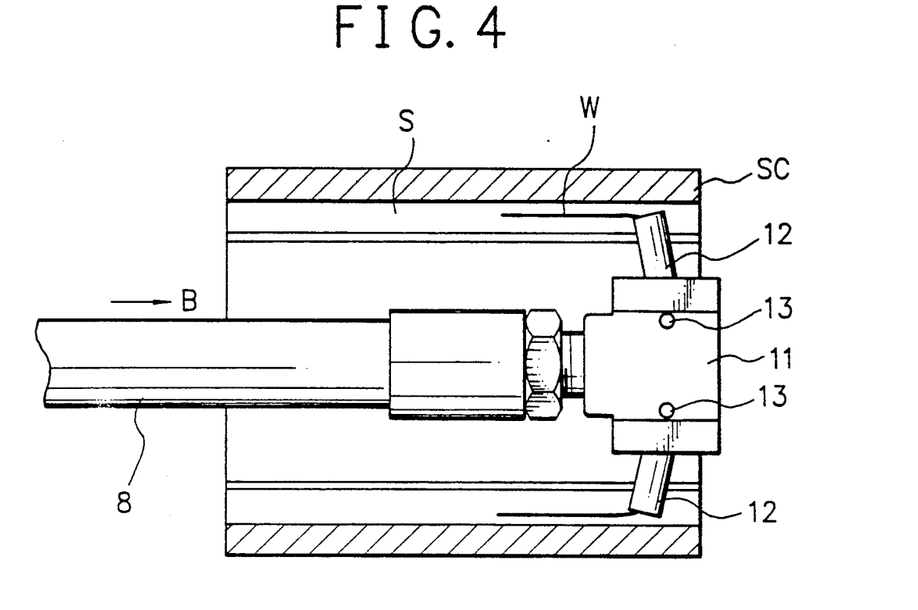
FIG. 4 is a partially sectional view illustrating a nozzle tilted condition during forward movement of the spindle.
Figure 6:
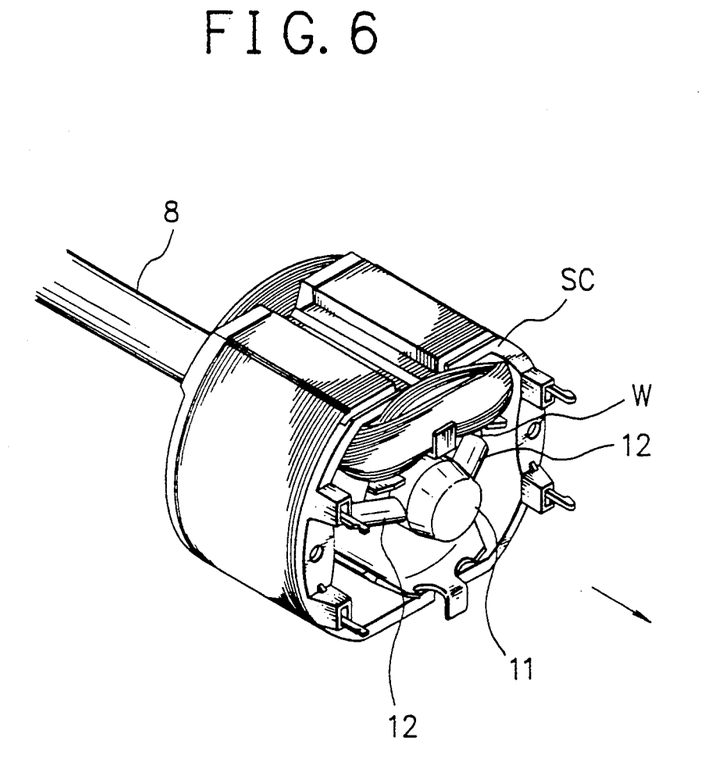
FIG. 6 is a perspective view illustrating the nozzle tilted condition during the forward movement of the spindle.

In the above construction, when the crank 1 is rotated in the direction of the arrow A, the spindle 8 is moved forth in a direction of arrow B shown in FIG. 4 through the connecting rod 3 and the slider 5 so as to insert each of the nozzles 12 into a slot S formed in a stator core SC. As a result, an outer end of each nozzle 12 is pulled by a tension of the wire W in a direction counter to the direction of the arrow B. Thus, as also shown in FIG. 6, a nozzle swinging means is constructed in such a manner that the nozzles 12 are designed to be tilted in a direction counter to the advancing direction of the spindle 8 about the respective shafts 13 against an elastic force of the respective bumpers 14. Accordingly, as apparent from FIG. 4, a bending angle of the wire W at the outer end of each nozzle 12 becomes a obtuse angle to thereby greatly reduce a frictional force at the outer end of each nozzle 12 upon drawing the wire W from each nozzle 12.

Figure 7:
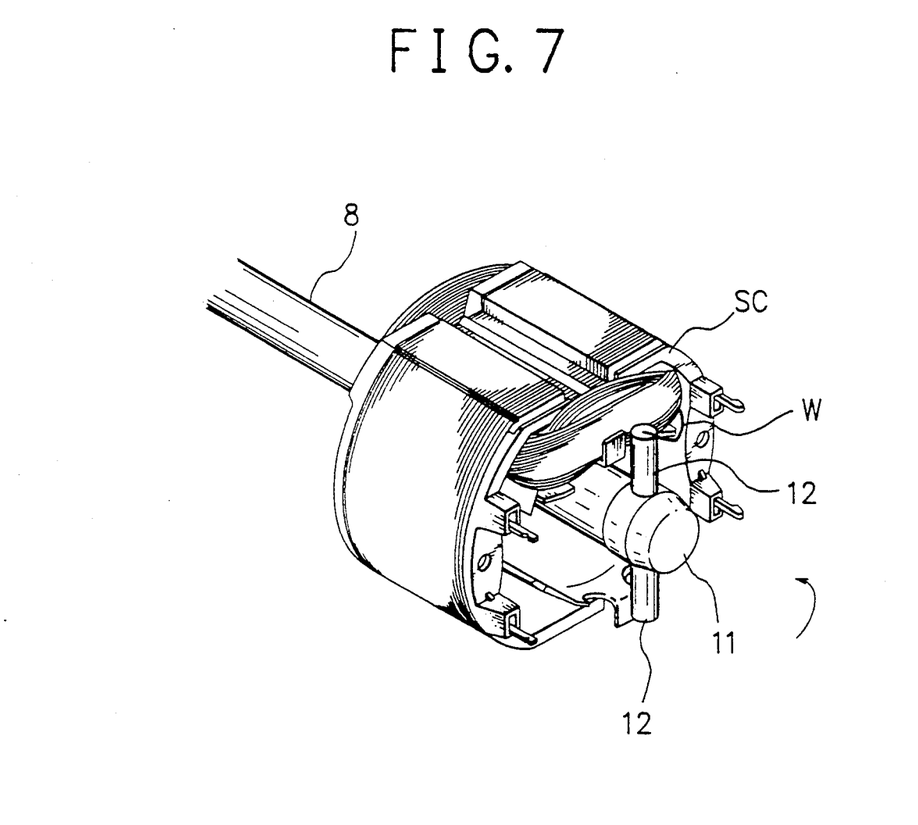
FIG. 7 is a perspective view illustrating a nozzle erected condition during rotation of the spindle.

As shown in FIG. 7, the tilted nozzles 12 inserted through the slot S of the stator core SC are moved along an edge of a coil guide plate of the stator core SC by the reciprocative rotation of the spindle 8, so that each nozzle 12 restores its normal condition that it is perpendicular to the spindle 8, and brings the wire W inside the coil guide plate.

Figure 5:
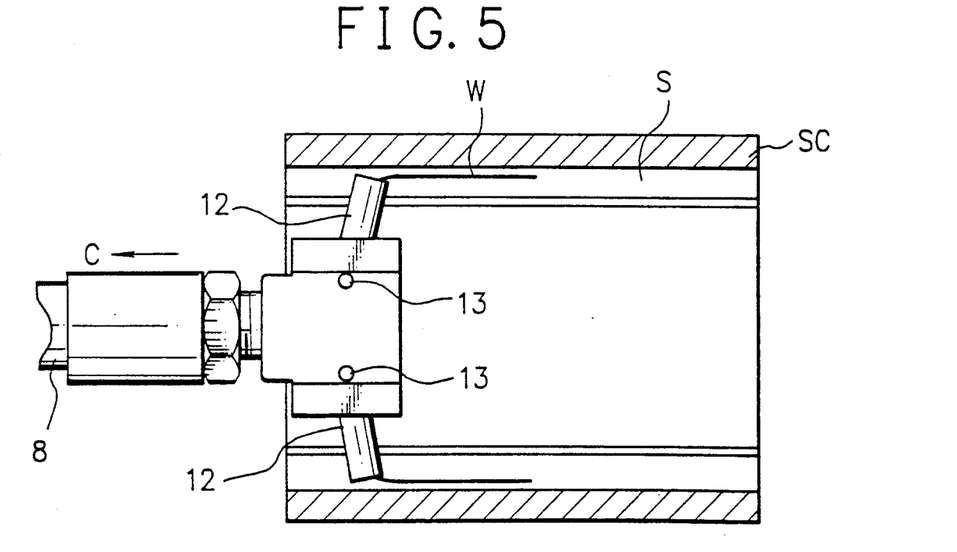
FIG. 5 is a partially sectional view illustrating a nozzle tilted condition during reverse movement of the spindle.
Figure 8:
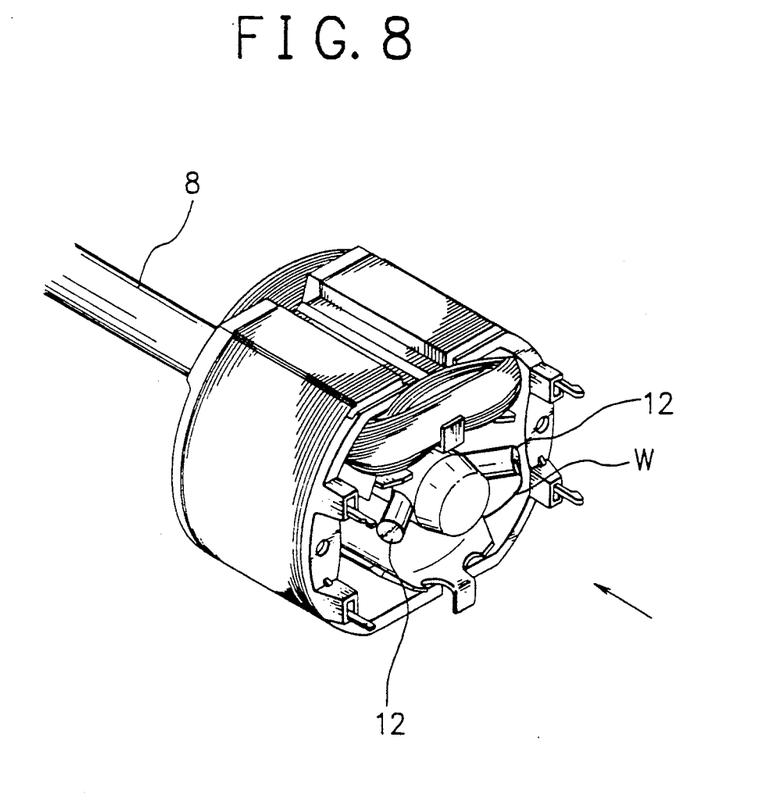
FIG. 8 is a perspective view illustrating the nozzle tilted condition during the reverse movement of the spindle.

When the spindle 8 is moved back in a direction of arrow C shown in FIG. 5 from the condition shown in FIG. 7, the outer end of each nozzle 12 is pulled in a direction counter to the direction of the arrow C by the tension of the wire W. Accordingly, as shown in FIG. 8, the nozzles 12 are tilted about the respective shafts 13 against the elastic force of the respective bumpers 14, FIG. 2, so that the bending angle of the wire W at the outer end of each nozzle 12 becomes an obtuse angle to thereby greatly reduce a frictional force at the outer end of each nozzle 12 upon drawing the wire W from each nozzle 12.

Such a great reduction in the frictional force upon drawing the wire W creates an advantage such that an amount of fluctuation in the tension of the wire W can be remarkably reduced. Accordingly, in a tension device for applying an initial tension to the wire W, fine adjustment of the tension can be carried out, and the spindle 8 can be lightly reciprocated in the axial direction. Furthermore, separation of a cover film of the wire W and rapid wear of the nozzles 12 can be prevented.

In the above preferred embodiment, the nozzles 12 are tilted by the tension of the wires W, and the construction of the stator coil winding device is accordingly simple. However, this construction has a disadvantage such that there is a possibility of the outer end of each nozzle 12 contacting the stator core SC, so that each nozzle 12 cannot be largely tilted.

Figure 9:
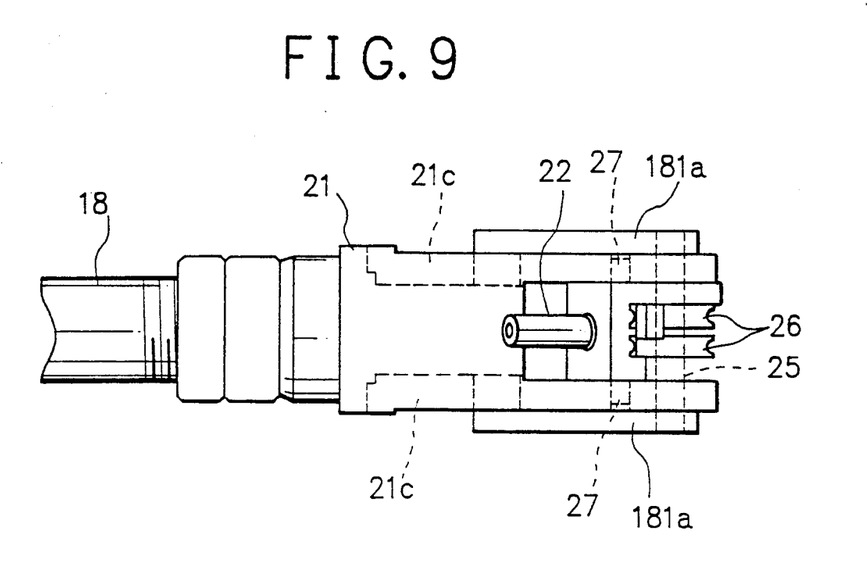
FIG. 9 is a plan view of an essential part of a second preferred embodiment of the present invention.
Figure 10:
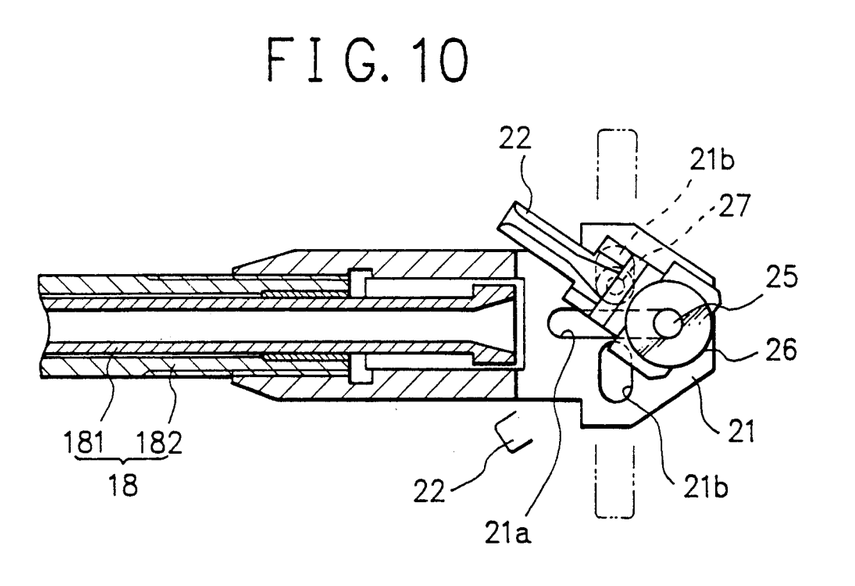
FIG. 10 is a sectional view of FIG. 9.
Figure 11:
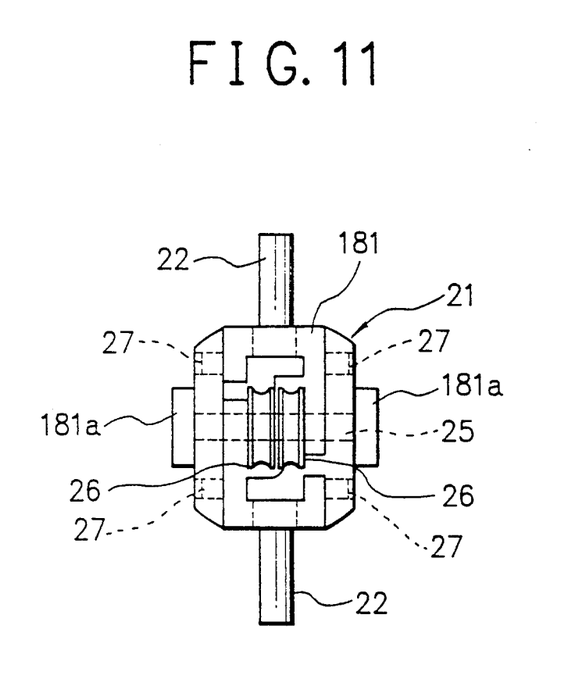
FIG. 11 is a side view illustrating an erected condition of nozzles shown in FIG. 9.

FIG. 9 is a plan view of an essential part of the stator coil winding machine according to a second preferred embodiment of the present invention improving the above-mentioned problem of the contact of the nozzles 12 in the first preferred embodiment; FIG. 10 is a sectional view of FIG. 9; and FIG. 11 is a side view of nozzles in a perpendicular condition.

In the second preferred embodiment, a spindle 18 is constituted of an inner shaft 181 and an outer shaft 182. The outer shaft 182 is rotatable together with the inner shaft 181, and is axially freely movable relative to the inner shaft 181. A nozzle holder 21 is fixed to a front end of the outer shaft 182.

The nozzle holder 21 is formed with upper and lower recesses 21c as viewed in FIG. 9. The inner shaft 181 is integrally formed with a pair of outer projections 181a inserted through the recesses 21c of the nozzle holder 21. A shaft 25 perpendicular to the axis of the spindle 18 is spanned between the two outer projections 181a. Two nozzles 22 and two pulleys 26 are rotatably mounted on the shaft 25. The nozzle holder 21 is formed with a pair of elongated holes 21a extending in the axial direction of the spindle 18, and the shaft 25 is loosely engaged with the elongated holes 21a of the nozzle holder 21. A pair of guide pins 27 are fixed to the opposite side surfaces of each nozzle 22. The nozzle holder 21 is formed with two pairs of elongated holes 21b extending in a direction perpendicular to the axis of the spindle 18, and the guide pins 27 of each nozzle 22 are loosely engaged with each pair of elongated holes 21b of the nozzle holder 21.

With this construction under the condition where the inner shaft 181 is projected rightwardly relative to the outer shaft 182 of the spindle 18 as shown in FIG. 10, the shaft 25 of the nozzles 22 is located at the right ends of the elongated holes 21a, and the guide pins 27 are located at the inner ends of the elongated holes 21b, so that the nozzles 22 may be largely tilted in such a manner that the outer ends of the nozzles 22 are moved leftwardly as viewed in FIG. 10.

A method of moving the inner shaft 181 relative to the outer shaft 182 in association with reciprocative rotation of the spindle 18 about the axis thereof will now be described with reference to FIG. 12.

A driving mechanism for driving the spindle 18 in the axial direction and the rotational direction is the same as that shown in FIG. 1, and so the explanation of the driving mechanism will be omitted herein. As described above, the spindle 18 is constituted of the inner shaft 181 and the outer shaft 182, and both the shafts 181 and 182 are spline-engaged with each other to allow integral rotation and independent axial movement.

Figure 12:
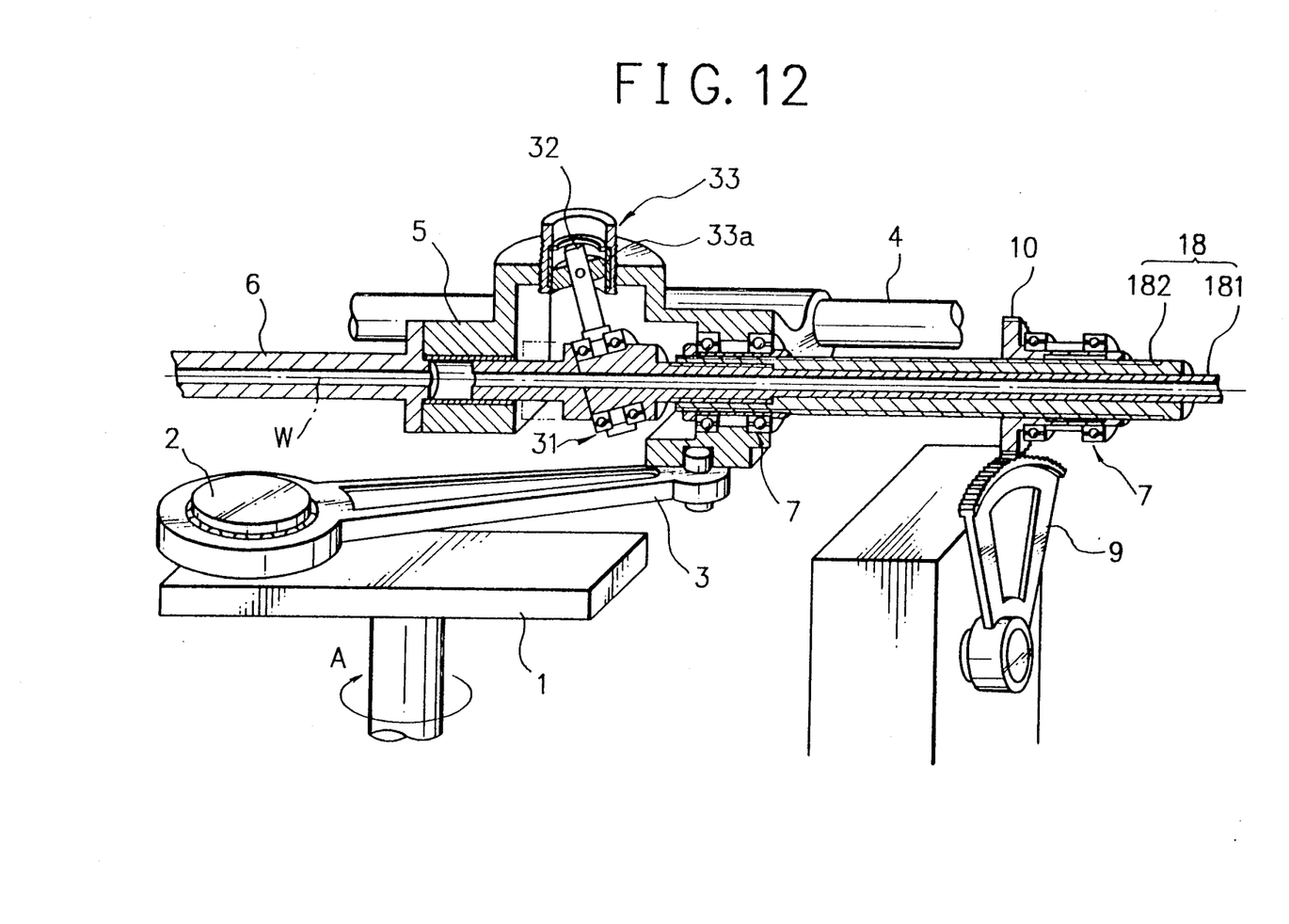
FIG. 12 is a sectional view illustrating a spindle driving portion of a stator coil winding machine according to a second preferred embodiment of the present invention.

Referring to FIG. 12, a pivot shaft 32 is mounted near a left end of the inner shaft 181 through a bearing 31 so as to be rotatable about an axis inclined relative to the axis of the inner shaft 181. A known spherical slide bearing 33 is threadedly engaged with the slider 5 so as to be adjustable in height. The pivot shaft 32 is engaged near a free end thereof with a spherical member 33a of the spherical slide bearing 33.

Figure 13:
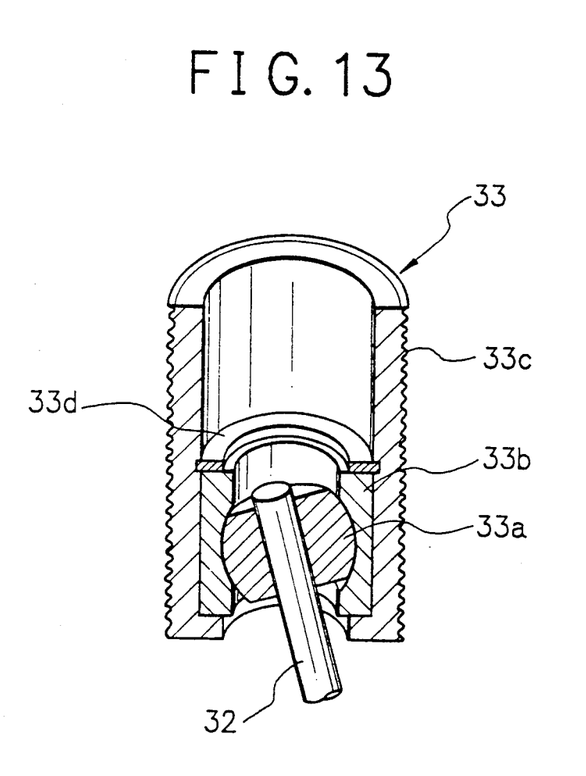
FIG. 13 is a sectional view illustrating a construction of a pivot shaft bearing shown in FIG. 12.

The detail of the spherical slide bearing 33 is shown in FIG. 13. Referring to FIG. 13, the spherical member 33a is rotatably supported to a support cylinder 33b. The support cylinder 33b is fixed by a snap ring 33d inside an outer cylinder 33c. By rotating the outer cylinder 33c about its axis, a distance from the spherical member 33a to the inner shaft 181 is changed to thereby adjust a position of the engaged portion of the pivot shaft 32 with the spherical member 33a, that is, a fulcrum position of the pivot shaft 32.

Referring back to FIG. 12, when the outer shaft 182 is reciprocatively rotated about its axis through a sector gear 9 and a driven gear 10, the inner shaft 181 spline-engaged with the outer shaft 182 is also rotated together with the outer shaft 182. When the inner shaft 181 is rotated, the pivot shaft 32 rotatably connected through the bearing 31 to the inner shaft 181 is swung about the engaged portion between the pivot shaft 32 and the spherical member 33a. As a result, the swing motion of the pivot shaft 32 causes axial reciprocative movement of the inner shaft 181 to thereby tilt the nozzles 22.

In the same manner as illustrated in FIG. 7, the tilted nozzles 22 inserted through the slot S of the stator core SC are moved along the edge of the coil guide plate of the stator core SC to restore the normal or perpendicular condition from the tilted condition and being the wire W inside the coil guide plate. Just beyond an apex of the coil guide plate, the nozzles 22 start to be tilted in the reverse direction, and in the course of return in the slot S, the outer ends of the nozzles 22 do not contact the stator core SC.

According to the second preferred embodiment, various items such as a length of each nozzle 22, a tilt angle of each nozzle 22 and a tilt timing of each nozzle 22 can be freely set, and the winding machine can therefore be applied to various kinds of stator cores. By suitably defining the above items such as the length of each nozzle 22, an amount of projection of the outer ends of the nozzles 22 from the edge of the coil guide plate of the stator core SC can be minimized to thereby prevent falling of the coil from the coil guide plate. Further, the coil can be wound around a two-pole field with a coil guide plate without the aid of a shroud.

As described above, according to the stator coil winding machine of the present invention, the nozzles are adapted to be tilted in a direction counter to an advancing direction of the spindle. Accordingly, the friction of the wire at the outer end of each nozzle can be greatly reduced to thereby minimize a fluctuation of a wire tension, making easy the adjustment of a tension device, and lighten the axial reciprocation of the spindle.

Furthermore since the nozzles are tilted by utilizing the wire tension, the construction of the winding machine is simple to reduce a cost. In the other case, since the nozzles are tilted by utilizing the reciprocative rotation of the spindle, a tilt timing of the nozzles can be freely set to thereby prevent falling of the coil from the coil guide plate and eliminate the use of a shroud, depending on a shape of the stator core.

Having described an illustrative embodiment of the invention with reference to the accompanying drawings, it is to be understood that the invention is not limited to such a precise embodiment, and that various changes and modifications may be effected therein by one skilled in the art without departing from the scope and spirit of the invention as defined in the appended claims.

What is claimed is:

1. A stator cooil winding machine for winding a wire, including a spindle provided at one end thereof with a nozzle for supplying said wire, said wire being wound by reciprocating said spindle in an axial direction thereof and reciprocatively rotating said spindle about an axis thereof at opposite ends of a stroke of axial reciprocation of said spindle, characterized in that there is further procided nozzle mounting means for mounting said nozzle so as to be swingable in the axial direction of said spindle, said nozzle mounting means further mounting said nozzle to be tilted in a direction counter to an advancing direction of said spindle when drawing of said wire from said nozzle.

2. The stator coil winding machine as defined in claim 1, wherein said nozzle mounting means for mounting said nozzle to be swingable is driven by a tension of said wire acting in the direction counter to the advancing direction of said spindle.

3. The stator coil winding machine as defined in claim 2, wherein said nozzle is pivotably supported to a nozzle holder fixedly mounted to one end of said spindle, and a bumper having an elasticity is interposed between said nozzle holder and said nozzle to normally maintain said nozzle in a condition where said nozzle extends in a direction perpendicular to the axis of said spindle by an elastic force.

4. The stator coil winding machine as defined in claim 1, wherein said nozzle mounting means for mounting said nozzle so as to be swingable is driven by a drive device for reciprocatively rotating said spindle about the axis thereof.

5. The stator coil winding machine as defined in claim 4, wherein said spindle comprises an inner shaft and an outer shaft spline-engaged with said inner shaft so as to be rotatable together with said inner shaft and axially movable relative to said inner shaft, and said nozzle is pivotably supported to a nozzle holder fixedly mounted to one end of said outer shaft.

6. The stator coil winding machine as defined in claim 5, wherein said inner shaft is provided near one end thereof with a pivot shaft rotatable about an axis inclined relative to an axis of said inner shaft; said outer shaft is rotatably and non-slidably supported to a slider; and said pivot shaft is fixed to one end thereof to a spherical member of a spherical slide bearing fixed to said slider so that said spherical member is displaceable in a direction perpendicular to the axis of said spindle.

7. The stator coil winding machine as defined in claim 5, wherein said inner shaft is formed at one end thereof with an outer projection; said outer projection is formed with a first elongated hole extending parallel to the axial direction of said spindle and a second elongated hole extending orthogonally to the axial direction of said spindle; said nozzle is provided at one end thereof with a shaft slidably loosely engaged with said first elongated hole; and said nozzle is provided with a guide pin slidably loosely engaged with said second elongated hole.

* * * * *